US010669423B2

(12) United States Patent
Prejean

(10) Patent No.: US 10,669,423 B2
(45) Date of Patent: Jun. 2, 2020

(54) MODIFIED ASPHALT USING PHOSPHOROUS ACID

(71) Applicant: Performance Materials NA, Inc., Midland, MI (US)

(72) Inventor: George Wyatt Prejean, Orange, TX (US)

(*) Notice: Subject to any disclaimer, the term of this patent is extended or adjusted under 35 U.S.C. 154(b) by 105 days.

(21) Appl. No.: 15/749,216

(22) PCT Filed: Jul. 28, 2016

(86) PCT No.: PCT/US2016/044477
§ 371 (c)(1),
(2) Date: Jan. 31, 2018

(87) PCT Pub. No.: WO2017/027225
PCT Pub. Date: Feb. 16, 2017

(65) Prior Publication Data
US 2018/0223101 A1 Aug. 9, 2018

Related U.S. Application Data

(60) Provisional application No. 62/202,210, filed on Aug. 7, 2015, provisional application No. 62/251,946, filed on Nov. 6, 2015.

(51) Int. Cl.
C08L 95/00 (2006.01)
C08K 5/52 (2006.01)
C08L 23/08 (2006.01)

(52) U.S. Cl.
CPC ............... C08L 95/00 (2013.01); C08K 5/52 (2013.01); C08L 23/0884 (2013.01); C08L 2555/22 (2013.01); C08L 2555/50 (2013.01); C08L 2555/54 (2013.01); C08L 2555/64 (2013.01); C08L 2555/80 (2013.01); C08L 2555/84 (2013.01)

(58) Field of Classification Search
CPC ............. C08L 2555/22; C08L 2555/50; C08L 2555/54; C08L 2555/64; C08L 2555/80; C08L 2555/84; C08L 23/0884; C08L 95/00; C08L 95/005; C08K 5/52
See application file for complete search history.

(56) References Cited

U.S. PATENT DOCUMENTS

| 2,953,551 A | 9/1960 | White |
| 3,026,280 A | 3/1962 | Apotheker |
| 3,141,870 A | 7/1964 | Deex |
| 3,202,621 A | 8/1965 | Street |
| 3,274,086 A | 9/1966 | Potts |
| 3,281,383 A | 10/1966 | Zelinski et al. |
| 3,350,372 A | 10/1967 | Anspon et al. |
| 3,639,521 A | 2/1972 | Hsieh |
| 3,756,996 A | 9/1973 | Pugh et al. |
| 3,933,204 A | 1/1976 | Knapp |
| 3,933,710 A | 1/1976 | Fukushi et al. |
| 3,963,659 A | 6/1976 | Binder et al. |
| 4,036,799 A | 7/1977 | Westermann |
| 4,070,532 A | 1/1978 | Hammer |
| 4,100,123 A | 7/1978 | Westermann |
| 4,139,511 A | 2/1979 | Hayashi et al. |
| 4,157,428 A | 6/1979 | Hammer |
| 4,301,051 A | 11/1981 | Marzocchi et al. |
| 4,340,518 A | 7/1982 | Nolte et al. |
| 4,360,615 A | 11/1982 | Wang et al. |
| 4,451,598 A | 5/1984 | Decroix |
| 4,478,912 A | 10/1984 | Uffner et al. |
| 4,650,820 A | 3/1987 | Decroix |
| 4,822,427 A | 4/1989 | Graf et al. |
| 5,070,123 A | 12/1991 | Moran |
| 5,087,652 A | 2/1992 | Christell |
| 5,095,055 A | 3/1992 | Moran |
| 5,306,700 A | 4/1994 | Hojaji |
| 5,306,750 A | 4/1994 | Goodrich et al. |
| 5,331,028 A | 7/1994 | Goodrich |
| 5,532,066 A | 7/1996 | Latiolais et al. |
| 5,556,900 A | 9/1996 | Goodrich et al. |
| 6,011,095 A | 1/2000 | Planche et al. |
| 6,087,420 A | 7/2000 | Planche et al. |
| 6,117,926 A | 9/2000 | Engber et al. |
| 6,136,898 A | 10/2000 | Loza et al. |
| 6,399,680 B1 | 6/2002 | Engber et al. |

(Continued)

FOREIGN PATENT DOCUMENTS

| DE | 1644771 | 4/1971 |
| DE | 19502371 | 8/1996 |

(Continued)

OTHER PUBLICATIONS

PCT International Search Report for International Application No. PCT/US2004/017587, dated Oct. 13, 2004.
PCT International Search Report for International Application No. PCT/US2004/010044, dated Sep. 17, 2004.
PCT International Search Report for International Application No. PCT/US02/22290, dated Sep. 25, 2002.
PCT International Search Report and Written Opinion for Application No. PCT/US2016/044477; dated Nov. 7, 2016.
Jean Valery Martin, "Asphalt Chemically Modified With Polyphosphoric Acid", North East asphalt User / Producer Group Portsmouth, 2004, pp. 1-41.

(Continued)

Primary Examiner — Christopher M Rodd

(57) ABSTRACT

A modified asphalt composition comprises or is produced from asphalt and phosphorous acid. The composition optionally further comprises one or more of an ethylene copolymer that comprises copolymerized units derived from ethylene and an epoxy-containing comonomer and a non-reactive polymer such as a styrene/conjugated-diene block copolymer. Further provided are processes for producing the composition in addition to products such as paving materials and roofing materials that comprise the compositions.

19 Claims, No Drawings

(56) References Cited

U.S. PATENT DOCUMENTS

| | | |
|---|---|---|
| 6,414,056 B1 | 7/2002 | Puzic et al. |
| 6,414,820 B1 | 7/2002 | Coon et al. |
| 6,743,838 B2 | 6/2004 | Statz et al. |
| 6,946,528 B2 | 9/2005 | Domine et al. |
| 7,157,508 B2 | 1/2007 | Dean |
| 7,160,935 B2 | 1/2007 | Prejean |
| 7,608,142 B2 | 10/2009 | Thorstensson et al. |
| 9,028,602 B2 | 5/2015 | Chughtai et al. |
| 2002/0068776 A1* | 6/2002 | Guo ............ C08L 95/00 524/59 |
| 2003/0012754 A1 | 1/2003 | Yoshida et al. |
| 2006/0293420 A1 | 12/2006 | Prejean et al. |
| 2007/0027261 A1 | 2/2007 | Prejean et al. |
| 2008/0153945 A1 | 6/2008 | Prejean et al. |
| 2008/0200611 A1 | 8/2008 | Prejean et al. |
| 2008/0208769 A1 | 8/2008 | Beer et al. |
| 2014/0357774 A1 | 12/2014 | Schroeder |
| 2017/0002202 A1 | 1/2017 | Dubois et al. |
| 2018/0030276 A1 | 2/2018 | De Garavilla et al. |
| 2018/0223101 A1 | 8/2018 | Prejean |

FOREIGN PATENT DOCUMENTS

| | | |
|---|---|---|
| EP | 0106999 B1 | 2/1986 |
| EP | 0885935 A1 | 12/1998 |
| EP | 1866378 A1 | 12/2007 |
| JP | 61-016333 A | 1/1986 |
| JP | 11-181292 A | 7/1999 |
| WO | 91/09907 A1 | 7/1991 |
| WO | 98/23698 A1 | 6/1998 |
| WO | 2002/060993 | 8/2002 |
| WO | 2003/002671 | 1/2003 |
| WO | 2005/065177 A2 | 7/2005 |
| WO | 2006/107908 A1 | 10/2006 |
| WO | 2017/015104 A1 | 1/2017 |
| WO | 2017/116831 A1 | 7/2017 |

OTHER PUBLICATIONS

Inocente Domingo Matheus David, "Rheological Analysis of Asphalt Binders Modified with Elvaloy Terpolymer and Polyphosphoric Acid on the Multiple Stress Creep and Recovery Test", Materials and Structures, 2015, vol. 48(5), pp. 1405-1416.

\* cited by examiner

MODIFIED ASPHALT USING PHOSPHOROUS ACID

CROSS-REFERENCES TO RELATED APPLICATIONS

This application claims priority under 35 U.S.C. § 371 to International Application No. PCT/US2016/044477, filed on Jul. 28, 2016, which in turn claims priority to U.S. Provisional Appln. No. 62/202,210, filed on Aug. 7, 2015, and 62/251,946, filed on Nov. 6, 2015, each of which is incorporated herein by reference in its entirety.

FIELD OF THE INVENTION

This invention relates to asphalt modified with phosphorous acid that is useful in the road paving and roofing industries. This invention also relates to thermoplastic polymer blends with asphalt modified with phosphorous acid.

BACKGROUND OF THE INVENTION

Several patents and publications are cited in this description in order to more fully describe the state of the art to which this invention pertains. The entire disclosure of each of these patents and publications is incorporated by reference herein.

The use of bitumen in the manufacture of materials for highway and industrial applications has been known for a long time. Bitumen is the main hydrocarbon binder used in the field of road construction or civil engineering. To be able to be used as a binder in these different applications, the bitumen must have certain mechanical properties, and in particular elastic or cohesive properties. The mechanical properties of the bituminous compositions are determined by standardized tests of the different mechanical characteristics such as the softening point, the penetrability and the rheological characteristics in defined traction. Asphalts are performance graded (PG) by a set of specifications developed by the US federal government (Strategic Highway Research Program or SHRP). For example, PG58-34 asphalt provides good rut resistance at 58° C. (determined by AASHTO (American Association of State Highway Transportation Officials)) and good cold cracking resistance at −34° C.

In general, the conventional bitumens do not simultaneously have all of the required qualities and it has been known for a long time that the addition of acid and/or various polymers to these conventional bitumens makes it possible to modify the mechanical properties of the latter and to form modified bitumen compositions having improved mechanical qualities compared with those of the bitumens alone.

Asphalt sold for paving may be modified with polymers to improve rut resistance, fatigue resistance, cracking resistance, and can improve stripping resistance (from aggregate) resulting from increases in asphalt elasticity and stiffness. Addition of polymer to asphalt increases the higher number (provides higher temperature rut resistance) and improves fatigue resistance. Good low temperature properties are to a large extent dependent on the specific asphalt composition (e.g., flux oil content, penetration index), but the polymer type does influence low temperature performance.

The asphalt industry considers polymers for asphalt modification to be either elastomers or plastomers. Generally elastomeric polymers improve low temperature performance and plastomeric polymers decrease it. The word plastomer indicates a lack of elastomeric properties. Plastomers are sometimes used to modify asphalt because they can increase stiffness and viscosity, which improves rut resistance, but they are generally considered inferior to elastomers due to lack of significant improvements in fatigue resistance, creep resistance, cold crack resistance, etc. Styrene/butadiene/styrene block copolymers (SBS) is considered an elastomer, as are ethylene/butyl acrylate/glycidyl methacrylate terpolymer resin (EnBAGMA) and ethylene/vinyl ester/glycidyl methacrylate terpolymer resin (EEGMA), both of which are available from E. I. du Pont de Nemours and Company, Wilmington, Del., USA (hereinafter "DuPont") under the trademark Elvaloy® RET. Polyethylene (PE) and ethylene vinyl acetate (EVA) resins are considered plastomers. PE is not miscible with asphalt, so asphalt modified with it must be continuously stirred to prevent separation. Asphalt modified with PE must be prepared at the mix plant and cannot be shipped due to separation. PE therefore acts as filler and does not meaningfully increase the softening point of asphalt.

Among the polymers added to bitumens, random or block copolymers of an aromatic monovinyl hydrocarbon and a conjugated diene and in particular of styrene and butadiene or of styrene and isoprene are particularly effective as they dissolve very easily in the bitumens and confer upon them excellent mechanical and dynamic properties and in particular very good viscoelastic properties. U.S. Pat. No. 6,087,420 describes a method for producing bitumen/polymer compositions comprising at least one styrene-butadiene copolymer.

The use of other polymers as additives to asphalt (bitumen) is well known in the art. See for example U.S. Pat. Nos. 4,650,820 and 4,451,598, wherein terpolymers derived from ethylene, an alkyl acrylate and maleic anhydride are mixed with bitumen.

Also see for example U.S. Pat. Nos. 5,306,750, 6,011,095, 6,117,926 and 6,743,838 and U.S. Patent Application Publication 2007/0027261, wherein reactant epoxy-functionalized, particularly glycidyl-containing, ethylene copolymers are mixed and reacted with bitumen and, as taught in U.S. Pat. Nos. 6,011,095 and 6,117,926, with an acid catalyst or co-reactant to accelerate the rate of reaction and lower cost of the modified system. DuPont Elvaloy® RET resins (EnBAGMA and EEGMA) are excellent modifiers for asphalt and improve asphalt performance at low concentrations (1 to 2 weight %).

The improvement in asphalt properties with addition of Elvaloy® RET at such low concentrations may be due to a chemical reaction between the Elvaloy® RET and the functionalized polar fraction of asphalt (asphaltenes).

U.S. Pat. No. 5,331,028 describes blends of asphalt with a combination of glycidyl-containing ethylene copolymer and a styrene-conjugated diene block copolymer.

U.S. Pat. No. 9,028,602 discloses a bituminous composition comprising a bitumen in an amount ranging from 20 to 90 weight %, a carboxylic additive in an amount of from 0.25 to 5 weight %, and sulfur in an amount of 5 to 75 weight %, all percentages based on the weight of bitumen, carboxylic additive and sulfur, wherein the carboxylic additive is selected from carboxylic acids, carboxylic esters and carboxylic anhydrides.

U.S. Pat. No. 7,608,142 discloses a slow setting bitumen-aggregate mix for cold paving comprising a cationic oil-in-water emulsion in the presence of an emulsifier containing a tertiary amine and an acid.

Mixing asphalt with elastomers such as EnBAGMA and EEGMA requires significant mixing at elevated temperatures to achieve the benefits of their addition. EnBAGMA and EEGMA are presented in pellet form and are added to hot asphalt where the pellets soften and melt due to the heat and the stirring. The reaction occurs with heat alone but acids such as polyphosphoric acid (PPA) are sometimes added to reduce the reaction time with asphalt. Depending on mixing conditions, it may take 6 to 24 hours without acid compared to 1 to 6 hours with acid to obtain thorough mixing. The resultant polymer modified asphalt (PMA) may not be as elastic (as evidenced by a higher phase angle and low elastic recovery) without acid. Some asphalt producers use acid and others prefer heat alone because addition of acid can be a negative in some cases. For example, acids cannot be used with amine antistrips. Furthermore, the addition of PPA to a glycidyl-containing ethylene copolymer based PMA produced from a low asphaltene asphalt results in gelling. Moreover, the amount of glycidyl-containing ethylene copolymer is limited because higher amounts result in gelling. The addition of additional glycidyl-containing ethylene copolymer to a PMA to adjust properties also results in gelling. Finally, the properties of some PMA's produced with glycidyl-containing ethylene copolymer and PPA drift down with aging at elevated temperatures.

It is also known that the stability of the bitumen/polymer compositions can be improved by chemically coupling the polymer with the bitumen. This improvement extends the field of use of the bitumen-polymer compositions. The cross-linking of the bitumen/polymer compositions confers upon them very good properties in terms of storage stability, cohesion, elongation capacity and resistance to aging.

Because of the objections to the use of polyphosphoric acid described above, it is desirable to prepare polymer-modified asphalt compositions without using polyphosphoric acid to accelerate the blending process.

SUMMARY OF THE INVENTION

Accordingly, provided herein is an asphalt composition (particularly for use in paving and roofing applications) comprising asphalt and about 0.1 to about 2 weight % of phosphorous acid, based on the total weight of the asphalt composition.

Further provided is a polymer-modified asphalt composition, such as for example a polyepoxy-polymer-linked-asphalt composition, comprising
  (a) asphalt in about 89 to about 99.4 weight weight %, based on the total combined weight of component (a), component (b) and component (c);
  (b) about 0.5 to about 10 weight %, based on the total combined weight of component (a), component (b) and component (c), of an E/X/Y/Z epoxy-functionalized ethylene copolymer, wherein E is the copolymer unit —($CH_2CH_2$)— derived from ethylene; X is the copolymer unit —($CH_2CR^1R^2$)—, where $R^1$ is hydrogen, methyl, or ethyl, and $R^2$ is carboalkoxy, acyloxy, or alkoxy of 1 to 10 carbon atoms (X for example is derived from alkyl acrylates, alkyl methacrylates, vinyl esters, and alkyl vinyl ethers), present in from 0 to about 40 weight %, based on the total weight of the copolymer; Y is the copolymer unit —($CH_2CR^3R^4$)—, where $R^3$ is hydrogen or methyl and $R^4$ is carboglycidoxy or glycidoxy (Y for example is derived from glycidyl acrylate, glycidyl methacrylate, or glycidyl vinyl ether) present in from 0.3 to 25 weight %, based on the total weight of the copolymer, Z is the copolymer unit derived from one or more additional comonomers including carbon monoxide, sulfur dioxide, acrylonitrile, or other monomers, present in from 0 to about 10 weight %, based on the total weight of the copolymer, and the amount of copolymerized residues of ethylene (E) is complementary, that is, the total of the weight percentages of the copolymerized comonomers (for example, E, X, Y and Z) is equal to 100 wt %, based on the total weight of the ethylene copolymer; and
  (c) about 0.1 to about 1 weight % of phosphorous acid, based on the total combined weight of component (a), component (b) and component (c).

Further provided is a polymer-modified asphalt composition comprising a nonreactive polymer comprising an ethylene acrylate, ethylene methacrylate or ethylene vinyl acetate copolymer, styrene/conjugated-diene block copolymer, polyolefin, or combinations thereof, preferably a styrene/conjugated-diene block copolymer.

Further provided is a polymer-modified asphalt composition comprising an epoxy-functionalized ethylene copolymer (dipolymer or terpolymer) comprising copolymerized units of ethylene and copolymerized units of an epoxy-containing comonomer as described above; and an ethylene acrylate, ethylene methacrylate or ethylene vinyl acetate copolymer, styrene/conjugated-diene block copolymer, polyolefin, or combinations thereof, preferably a styrene/conjugated-diene block copolymer.

Yet further provided is a method for preparing a polymer modified asphalt, the method comprising:
  (1) providing an epoxy-functionalized ethylene copolymer (dipolymer or terpolymer) comprising copolymerized units of ethylene and copolymerized units of an epoxy-containing comonomer as described above, or a nonreactive polymer as described above, or a combination of the epoxy-functionalized ethylene copolymer and the nonreactive polymer;
  (2) heating and mixing the epoxy-functionalized ethylene copolymer, or the nonreactive polymer, or combination of polymers with asphalt to provide a polymer asphalt blend; and (3) adding phosphorous acid and mixing it with the polymer asphalt blend.

Finally, a road pavement or roofing material comprises an asphalt composition or a polymer-modified asphalt composition as described above.

DETAILED DESCRIPTION OF THE INVENTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Further, unless expressly stated to the contrary, the term "or" as used herein refers to an "inclusive or" and not to an "exclusive or." For example, a condition "A or B" is satisfied by any one of the following: A is true (or present) and B is false (or not present); A is false (or not present) and B is true (or present); and both A and B are true (or present). As used herein, the terms "a" and "an" include the concepts of "at least one" and "one or more than one". The word(s) following the verb "is" can be a definition of the subject.

The term "consisting essentially of" in relation to compositions is to indicate that substantially (greater than 95 weight % or greater than 99 weight %) the only polymer(s) present in a composition is the polymer(s) recited. Thus this term does not exclude the presence of impurities or additives, e.g. conventional additives. Moreover, such additives may possibly be added via a master batch that may include other polymers as carriers, so that minor amounts (less than 5 weight % or less than 1 weight %) of polymers other than those recited may be present. Any such minor amounts of these materials do not change the basic and novel characteristics of the composition.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

Unless stated otherwise, all percentages, parts, ratios, etc., are by weight.

Further, when an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range. When a component is indicated as present in a range starting from 0, such component is an optional component (i.e., it may or may not be present). When present, an optional component may be present at a level of at least 0.1 weight % of the composition or copolymer, unless present at specified lower amounts. Finally, when the term "about" is used in describing a value or an end-point of a range, the disclosure should be understood to include the specific value or end-point referred to.

When materials, methods, or machinery are described herein with the term "known to those of skill in the art", "conventional" or a synonymous word or phrase, the term signifies that materials, methods, and machinery that are conventional at the time of filing the present application are encompassed by this description. Also encompassed are materials, methods, and machinery that are not presently conventional, but that may have become recognized in the art as suitable for a similar purpose.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 15 weight % of acrylic acid", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

Polymers having more than two types of monomers, such as terpolymers, are also included within the term "copolymer" as used herein. A dipolymer consists essentially of two copolymerized comonomers and a terpolymer consists essentially of three copolymerized comonomers. The term "consisting essentially of" in reference to copolymerized comonomers allows for the presence of minor amounts (i.e. no more than 0.5 weight %) of non-recited copolymerized units, for example arising from impurities present in the commoner feedstock or from decomposition of comonomers during polymerization.

The term "(meth)acrylate" as used herein refers to methacrylate or acrylate. For example, the term "alkyl (meth) acrylate" refers to alkyl acrylate or alkyl methacrylate.

The terms "asphalt" and "bitumen" are synonymous and used interchangeably in the industry and herein to refer to the naturally-derived component of viscous binding compositions used for paving and roofing applications. "Bitumen" typically refers to the primarily hydrocarbon base material that is mixed with other components. "Asphalt" may refer to the hydrocarbon base material and may also be used to refer to the final composition, including additives and aggregates, as described below. In the remainder of the description, for reasons of simplicity, the term "polymer-modified asphalt" and the acronym "PMA" are used to refer to a polymer-modified composition comprising bitumen or asphalt and to a polymer modified composition that comprises bitumen or asphalt and that is cross-linked.

Finally, the term "gel" and related terms such as "gelling" are used herein to describe an effect that renders the composition unsuitable for paving. A composition that has gelled is characterized by a Brookfield viscosity (ASTM D-4402, 135° C.) greater than 3.00 Pascal-seconds. Gelling may be the result of polymer/polymer cross-linking instead of a polymer/asphalt reaction.

Described herein is the reaction and resultant linking of epoxide-containing polymers to asphalt forming a polyepoxy-polymer-linked-asphalt composition using phosphorous acid to accelerate the reaction. Use of phosphorous acid as a catalyst/co-reactant for the ethylene copolymer/asphaltene reaction surprisingly overcomes the known disadvantages of using PPA as a catalyst/co-reactant.

Each of the components of the composition is described more fully below. The polymer modified asphalts described herein have improved high temperature resistance, improved high elasticity at ambient and low temperatures as well as good toughness and tenacity values without the use of polyphosphoric acid.

Asphalt

The bitumen or asphalt base used in the invention comprises one or more bitumens of different origins. Representative sources for asphalts include native rock, lake asphalts, petroleum asphalts, airblown asphalts, cracked or residual asphalts. Bitumens may be of natural origin, such as those contained in deposits of natural bitumen, natural asphalt or bituminous sands Asphalt more commonly can be obtained as a residue in the distillation or refining of petroleum, such as from vacuum tower bottoms (VTB). All types of asphalts (bitumens) are useful whether they be natural or synthetic. These bitumens can be optionally blown, visbroken or deasphalted. The bitumens can be of hard or soft grade. The different bitumens obtained by different refining processes can be combined, for example to improve the performance profile of the asphalt composition.

Chemically, asphalt is a complex mixture of hydrocarbons, which can be separated into two major fractions, asphaltenes and maltenes. The asphaltenes are polycyclic aromatics and most contain polar functionality. Some or all of the following functionalities are present: carboxylic acids, amines, sulfides, sulfoxides, sulfones, sulfonic acids, porphyrin rings chelated with V, Ni and Fe. The maltene phase contains polar aromatics, aromatics, and naphthene. It is generally believed that asphalt is a colloidal dispersion with the asphaltenes dispersed in the maltenes; the dispersing agent being the polar aromatics. The asphaltenes are relatively high in molecular weight (about 1500) as compared with the other components of asphalt. The asphaltenes are amphoteric (acid and base on the same molecule) in nature and form aggregates through self-association that offer some viscoelastic behavior to asphalt. Asphaltenes vary in amount and functionality depending on the crude source from which the asphalt is derived. Examples of asphalts include Ajax, Marathon, Wyoming Sour, Mayan, Venezuelan, Canadian, Arabian, Trinidad Lake, Salamanca and combinations of two or more thereof.

All asphalts containing asphaltenes can be used. The asphalt can be of low or high asphaltene content. Under these circumstances, the asphaltene concentration in the composition can range from about 0.0001 to about 30 weight % such that the asphalt can react with the ethylene copolymer but may not react with the phosphorous acid catalyst or decompose with heat. For example but not limitation, the asphaltene content can be from about 0.01 to about 30, about 0.1 to about 15, about 1 to about 10, or about 1 to about 5%, by weight. High asphaltene asphalts typically contain more than 7 weight % asphaltenes or more than 10 weight % asphaltenes. Generally, the asphalts useful in this invention will contain less than 5 weight % oxygen compounds and frequently less than 1 weight % oxygen compounds.

The bitumens are advantageously chosen from road-surface bitumens of classes 10/20 to 160/220 and special bitumens of all classes.

The preferred proportions of the bitumen base present in the PMA represent between 90% and 99.4% by mass, preferably between 94% and 99% by mass, based on the total mass of the polymer/bitumen mixture.

Preferred asphalts have a viscosity at 135° C. of 100 to 10,000 centipoise, preferably 200 to 3,000.

A modified asphalt may also be used. For example, a sulfonated asphalt or salt thereof (e.g., sodium salt), an oxidized asphalt, or combinations thereof may be used in combination of the asphalt disclosed above.

Phosphorous Acid

The asphalt composition and the polymer-modified asphalt composition comprise phosphorous acid to improve their end-use properties. Phosphorous acid has the empirical formula $H_3PO_3$; however, it is more clearly described by the semi-structural formula $HPO(OH)_2$. This species exists in equilibrium with a minor tautomer $P(OH)_3$. IUPAC recommendations from 2005 are that the latter be called phosphorous acid, whereas the dihydroxy form is called phosphonic acid. As used herein the term "phosphorous acid" refers to either tautomer and to any mixture of the two tautomers. Phosphorous acid is a diprotic acid, since the hydrogen bonded directly to the central phosphorus atom is not readily ionizable The pKa constants for the first and second deprotonations are 1.3 and 6.7, respectively. Phosphorous acid is a white crystalline material that melts at 64° C. to 74° C.

Thus, phosphorous acid is significantly easier to handle, transport and mix with asphalt compared to polyphosphoric acid (PPA).

Phosphorous acid in its protonated, partially deprotonated and deprotonated forms are good reducing agents, although not necessarily quick to react. This reducing behavior may improve deterioration or "aging" of asphalt properties compared to asphalt modified with PPA, such as increased brittleness, rutting, fatigue and/or cold temperature cracking. Without wishing to be held to theory, these failures may be caused by oxygen penetration and oxidation of the asphalt components, which are reduced or eliminated by the reducing properties of the phosphorous acid.

Phosphorous acid on heating at 200° C. converts to phosphoric acid and phosphine:

$$4\ H_3PO_3 \rightarrow 3\ H_3PO_4 + PH_3.$$

The asphalt compositions may comprise about 0.1 to about 2 weight % of the phosphorous acid, based on the total weight of the asphalt composition, such as from about 0.1 to about 0.5 weight % or about 1.5 weight %. When used in combination with polymer modifiers described below, phosphorous acid may be present in amounts of from about 0.1 to about 0.5 weight % or to about 1.0 weight %, based on the total weight of the polymer modified asphalt composition.

Epoxy-Functionalized Ethylene Copolymer

The epoxy-functionalized ethylene copolymer useful in the invention comprises an E/X/Y/Z epoxy-functionalized ethylene copolymer, wherein E is the copolymer unit $—(CH_2CH_2)—$ derived from ethylene; X is the copolymer unit $—(CH_2CR^1R^2)—$, where $R^1$ is hydrogen, methyl, or ethyl, and $R^2$ is carboalkoxy, acyloxy, or alkoxy of 1 to 10 carbon atoms (X for example is derived from alkyl acrylates, alkyl methacrylates, vinyl esters, and alkyl vinyl ethers), present in from 0 to about 40 weight % of the copolymer; Y is the copolymer unit $—(CH_2CR^3R^4)—$, where $R^3$ is hydrogen or methyl and $R^4$ is cathoglycidoxy or glycidoxy (Y for example is derived from glycidyl acrylate, glycidyl methacrylate, or glycidyl vinyl ether) present in from 0.3 to 25 weight % of the copolymer, and 0 to 10 weight % of copolymer units Z derived from one or more additional comonomers including carbon monoxide, sulfur dioxide, acrylonitrile, or other monomers. The E/X/Y/Z epoxy-functionalized ethylene copolymer may contain one or more comonomers of each type X, Y or Z. The weight percentages of the copolymerized repeat units are based on the total weight of the epoxy-functionalized ethylene copolymer. In addition, the amount of copolymerized ethylene repeat units is complementary to the amounts of the copolymerized repeat units of the other comonomers in the copolymer. Stated alternatively, the sum of the weight percentages of the copolymerized repeat units of all of the comonomers in the copolymer is 100 wt % of the total weight of the epoxy-functionalized ethylene copolymer.

Preferably, the epoxy-functionalized ethylene copolymer is a glycidyl-containing polymer. Suitable glycidyl-containing ethylene copolymers and modified copolymers are well known in the polymer art and can readily be produced by the concurrent reaction of monomers in accordance with U.S. Pat. No. 4,070,532.

The glycidyl moiety may be represented by the following formula:

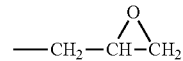

The glycidyl-containing ethylene copolymer can comprise, consist essentially of, or consist of, repeat units derived from ethylene, other comonomers listed herein and an epoxy comonomer including, for example, glycidyl esters of acrylic acid or methacrylic acid, glycidyl vinyl ether, or combinations thereof where the epoxy comonomer may be incorporated into the glycidyl-containing ethylene copolymer from a lower limit of about 0.3, about 0.5, or about 1 weight % to an upper limit of about 12%, 15%, or 25 weight %, based on the total weight of the epoxy-functionalized ethylene copolymer. The comonomer can include glycidyl acrylate, glycidyl methacrylate, glycidyl butyl acrylate, glycidyl vinyl ether, or combinations of two or more thereof.

Generally useful glycidyl-containing, epoxy-functionalized ethylene copolymers will contain from about 0.3 (or about 0.5) to about 12 wt % or higher, such as 4, 5, 5.25 or 9 weight %, of comonomers containing glycidyl moieties. Other useful glycidyl-containing, epoxy-functionalized ethylene copolymers will contain from 15.1 to about 25 weight % of comonomers containing glycidyl moieties, such as 16 to 25 weight %.

Preferred epoxy-functionalized ethylene copolymers are represented by the formula E/X/Y, where E is the copolymer unit —($CH_2CH_2$)— derived from ethylene; X is the copolymer unit —($CH_2CR_1R_2$)—, where $R_1$ is hydrogen, methyl, or ethyl, and $R_2$ is carboalkoxy, acyloxy, or alkoxy of 1 to 10 carbon atoms (X for example is derived from alkyl acrylates, alkyl methacrylates, vinyl esters, and alkyl vinyl ethers); and Y is the copolymer unit —($CH_2CR_3R_4$)—, where $R_3$ is hydrogen or methyl and $R_4$ is carboglycidoxy or glycidoxy (Y for example is derived from glycidyl acrylate or glycidyl methacrylate). Suitable epoxy-containing comonomer units, Y, may also be derived from vinyl ethers of 1 to 10 carbon atoms (e.g., glycidyl vinyl ether) or mono-epoxy substituted di-olefins of 4 to 12 carbon. The $R_4$ in the above formula includes an internal glycidyl moiety associated with a cycloalkyl monoxide structure; e.g., Y derived from vinyl cyclohexane monoxide.

Suitable weight percentages (based on total weight of E, X, and Y in the copolymer) of the E/X/Y epoxy-functionalized ethylene copolymerized repeat units preferably are 0 to about 40 weight % (or when X is present, preferably about 10 to about 40 or about 15 to about 35 weight %) of X, about 0.3 (or about 0.5) to about 12 or to 15 weight %, such as 4, 5, 5.25 or 9 weight % of Y, and complementarily E makes up the remainder of the copolymer's composition. Preferably, Y is selected from glycidyl acrylate or glycidyl methacrylate, more preferably glycidyl methacrylate. Other epoxy-functionalized ethylene copolymers contain from 15.1 to about 25 weight % of comonomers containing glycidyl acrylate or glycidyl methacrylate, such as 16 to 25 weight %. These copolymers are described in greater detail in U.S. Provisional Patent Application No. 62/195,947.

For example, an E/GMA is a dipolymer comprising repeat units derived from copolymerization of ethylene and glycidyl methacrylate (i.e., X is 0 weight % of the copolymer).

The epoxy-functionalized ethylene copolymer may optionally include repeat units derived from an ester of unsaturated carboxylic acid such as (meth)acrylate or $C_1$ to $C_8$ alkyl (meth)acrylate, or combinations of two or more thereof (an E/X/Y terpolymer as described above). Particularly useful (meth)acrylates include iso-butyl acrylate, n-butyl acrylate, iso-octyl acrylate, methyl acrylate or methyl methacrylate.

Notable E/X/Y terpolymers comprise copolymerized units of ethylene, n-butyl acrylate and glycidyl methacrylate (an ENBAGMA copolymer) or copolymerized units of ethylene, methyl acrylate and glycidyl methacrylate (an EMAGMA copolymer).

The epoxy-functionalized ethylene copolymer can optionally include repeat units derived from a $C_2$ to $C_8$ carboxylic acid ester of an unsaturated alcohol such as vinyl alcohol (an E/X/Y terpolymer as described above) wherein the vinyl ester is X (an EEGMA copolymer). A particularly useful vinyl ester is vinyl acetate. A notable E/X/Y terpolymer comprises copolymerized units of ethylene, vinyl acetate and glycidyl methacrylate (an EVAGMA copolymer).

It is also preferred that the epoxy-containing monomers be incorporated into the epoxy-functionalized ethylene copolymer by the concurrent reaction of monomers (direct or random copolymerization) and not by grafting onto the reactant polymer, i.e., "graft polymerization."

Preferably, the epoxy-containing polymer has a melt flow index as determined by ASTM D1238-65T, Condition E, of about 0.3 to about 2000 grams/10 minutes, more preferably about 1 to about 500 grams/10 minutes, or about 1 to about 100 grams/10 minutes, or about 1 to about 50 grams/10 minutes.

The polymer-modified asphalt composition comprises about 0.5 to about 10 weight % of the epoxy-containing polymer, based on the total weight of the polymer-modified asphalt composition, such as from about 0.5 to about 3 or about 5 weight % of the epoxy-containing polymer.

Non-Reactive Polymers

Non-reactive polymers are polymeric compositions that are known in the art for inclusion in polymer-modified asphalt and that do not react with the asphalt. They may be used together with phosphorous acid to modify asphalt in the absence of a reactive polymer such as the epoxy-containing polymers described above. Optionally, non-reactive or "diluent" polymers may be further included in the polyepoxy-polymer-linked-asphalt composition described above, in combination with phosphorous acid. Preferably, these non-reactive polymers are also non-reactive towards the epoxy-functionalized ethylene copolymers and the functionalized polyolefins.

Suitable non-reactive polymers include, without limitation, ethylene alkyl acrylate, ethylene alkyl methacrylate or ethylene vinyl acetate copolymers, styrene/conjugated-diene block copolymers including styrene polybutadiene or isoprene, ethylene butene block copolymers (e.g., SBS, SIS, and SEBS block copolymers), polyolefins produced by any process known in the art with any known transition metal catalyst or single-site catalyst, or combinations thereof. More specifically, the non-reactive polymers include olefinic polymers such as polyethylene, polypropylene, polybutene, polyisobutene, ethylene/propylene copolymers, ethylene/propylene/diene terpolymers, or polymers such as polybutadiene, polyisoprene or polynorbornene.

These non-reactive polymers can be combined with phosphorous acid to modify asphalt in amounts that range from a lower limit of 0.1 or 1 to an upper limit of 5, 10, 15 or 18 weight %, based on the total weight of the polymer-linked-asphalt composition.

Moreover, the non-reactive polymers can be combined into the reactive asphalt, reactive epoxy-functionalized ethylene copolymers and reactive functionalized polymers in amounts that range from 0 to 18 weight %, or 0 to 15 weight %, or 0 to 10 weight %, or 0 to 5 weight %, based on the total weight of the polymer-modified asphalt composition. When present, the non-reactive polymer may be included from a lower limit of 0.1 or 1 to an upper limit of 5, 10, 15, or 18 weight % of the PMA composition.

Styrene/Conjugated-Diene Block Copolymer

Preferred nonreactive polymers include styrene/conjugated-diene block copolymers. The styrene/conjugated-diene block copolymers useful in this invention are well-known polymers derived from, or comprising, styrene and a conjugated-diene, such as butadiene, isoprene, ethylene butene, 1,3-pentadiene and the like. For simplicity, the term "styrene-butadiene-styrene" block copolymer, or "SBS" copolymer, unless specified more narrowly, will be used herein to refer to any such polymers of styrene and a conjugated diene.

The styrene/conjugated-diene block copolymers may be di-, tri- or poly-block copolymers having a linear or radial (star or branched) structure, with or without a random junction. Suitable block copolymers include, for example, diblock A-B type copolymers; linear (triblock) A-B-A type copolymers; and radial (A-B)$_n$ type copolymers; wherein A refers to a copolymer unit derived from styrene and B refers to a copolymer unit derived from a conjugated-diene. Preferred block copolymers have a linear (triblock) A-B-A type structure or a radial (A-B)$_n$ type structure.

Generally, the styrene/conjugated-diene block copolymer will contain about 10 to about 50 weight % of copolymer units derived from styrene and about 50 to about 90 weight % of copolymer units derived from a conjugated diene, preferably butadiene or isoprene, more preferably butadiene. More preferably, 20 to 40 weight % of the copolymer units will be derived from styrene, the remainder being derived from the conjugated-diene.

Preferably, the styrene/conjugated-diene block copolymers have a weight-average molecular weight from a lower limit of about 10,000, 30,000, 100,000, 150,000 or 200,000 daltons to a higher limit of about 500,000, 600,000, 750,000 or 1,000,000 daltons. The weight-average molecular weight of the styrene/conjugated-diene block copolymer can be determined using conventional gel permeation chromatography.

The melt flow index of the styrene/conjugated-diene block copolymer will typically be in the range from about 0 to about 200 g/10 min, preferably about 0 to 100 g/10 min, more preferably about 0 to 10 g/10 min, as determined by ASTM Test Method D 1238, Condition G.

Notable SBS copolymers have an overall content of 50 to 95% by weight of butadiene and the content of units containing a 1,2 double bond resulting from butadiene of 12 to 50 weight % of the copolymer. The weight-average molecular mass of the copolymer of styrene and of butadiene can be between 10,000 and 600,000 daltons, preferably between 30,000 and 400,000 daltons.

The copolymers of styrene and conjugated-diene can be prepared by anionic polymerization of the monomers in the presence of initiators composed of organometallic compounds of alkali metals, in particular organolithium compounds, such as alkyllithium and preferably butyllithium, the preparation being carried out at temperatures of less than or equal to 0° C. and in solution in a solvent that is at least partly composed of a polar solvent, such as tetrahydrofuran or diethyl ether. Preparation procedures include those described in U.S. Pat. Nos. 3,281,383 and 3,639,521.

Suitable styrene/conjugated-diene block copolymers are commercially available, for example, under the tradenames KRATON™, EUROPRENE SOL™ and SOLPRENE™ from Shell Chemical Company, Enichem and Phillips Petroleum Company, respectively.

Specific SBS copolymers include a block copolymer with a weight-average molecular mass of 120,000 daltons and containing, by weight, 25% of copolymerized styrene and 75% of copolymerized butadiene, including an amount of units containing a 1,2 double bond representing 9% of the copolymer;

a diblock copolymer of styrene and of butadiene with a random junction having a weight-average molecular mass of 280,000 daltons and containing, by weight, 15% of copolymerized styrene, including 10% in the block form, and 85% of copolymerized butadiene, including 8% in the form of units containing a 1,2 double bond;

a diblock copolymer of styrene and of butadiene having a weight-average molecular mass of 120,000 daltons and containing, by weight, 25% of copolymerized styrene and 75% of copolymerized butadiene, including an amount in the form of units containing a 1,2 double bond representing 30% of the copolymer; and a diblock copolymer of styrene and of butadiene with a random junction having a weight-average molecular mass of 150,000 daltons and containing, by weight, 25% of copolymerized styrene, including 17% in block form, and 75% of copolymerized butadiene, including an amount in the form of units containing a 1,2 double bond representing 35% of the copolymer.

The styrene polybutadiene or isoprene, ethylene butene block copolymers (e.g., SBS, SIS, SEBS block copolymers) can be combined with phosphorous acid to modify asphalt in an amount ranging from a lower limit of 0.1 or 1 to an upper limit of 5, 10, 15 or 18 weight %, based on the total weight of the polymer-linked-asphalt composition.

Notable polymer-modified asphalt compositions comprise an epoxy-containing polymer and 0 weight % of styrene polybutadiene or isoprene, ethylene butene block copolymers (e.g., SBS, SIS, SEBS block copolymers). Alternatively, the epoxy-containing polymer, styrene polybutadiene or isoprene, ethylene butene block copolymer (e.g., SBS, SIS, SEBS block copolymer), and phosphorous acid can be incorporated into asphalt to provide a PMA. When present in the PMA, the amount of the styrene block copolymers ranges from a lower limit of 0.1 or 1 to an upper limit of 5, 10, 15, or 18 weight %, based on the total weight of the polymer modified asphalt composition.

Non-Polymeric Additives

Other, non-polymeric additives may be present in the modified asphalt. For example, the asphalt composition may also comprise flux oil or liquid plasticizer, amine scavenger, hydrogen sulfide scavenger, sulfur source, or any combination of two or more of these additives.

Flux oils encompass many types of oils used to modify asphalt and are the final products in crude oil distillation. They are non-volatile oils that are blended with asphalt to soften it. They can be aromatic such as Paulsboro's ValAro, paraffinic such as HollyFrontier's Hydrolene™, or mineral such as Sonnerborn's Hydrobryite™. Flux oils can also be any renewable-produced vegetable or bio-oil. Blends of two or more flux oils are also contemplated.

A liquid plasticizer is an additive that increases the plasticity or fluidity of a material. The major applications are for plastics, such as phthalate esters for improving the flexibility and durability of polymer compositions. Examples of suitable liquid plasticizers include, without limitation, carboxylate esters, for example any dicarboxylic or tricarboxylic ester-based plasticizers, such as bis(2-ethylhexyl) phthalate (DEHP), di-octyl phthalate (DOP), diisononyl phthalate (DINP), and diisodecyl phthalate (DIDP). Suitable liquid plasticizers also include acetic acid esters of monoglycerides made from castor oil; and other nonphthalate plasticizers for PVC including trimellitates, such as tris(2-ethylhexyl) trimellitate, adipates such as bis (2-ethylhexyl) adipate, benzoates such as 1,5-pentanediol dibenzoate, adipic acid polyesters, polyetheresters, and epoxy esters or maleates.

Suitable levels of these materials and methods of incorporating them into the asphalt composition are described in detail in U.S. Provisional Patent Application No. 62/121,078 (Intl. Patent Appln. No. PCT/US2016/019764. Briefly, however, the ratio of ethylene copolymer to flux oil or a liquid plasticizer ranges from 20:80 to 95:5, by weight based on the total weight of the ethylene copolymer and the flux oil or liquid plasticizer. In addition, when the flux oil or liquid plasticizer is present, its level is preferably about 0.01 to about 10 weight %, based on the total weight of the based on the total weight of the asphalt composition.

A hydrogen sulfide scavenger is an agent capable of neutralizing hydrogen sulfide ($H_2S$). It is a compound or a mixture of compounds which combines with $H_2S$ so as to "collect" or "scavenge" it. Preferred hydrogen sulfide scavengers exhibit this reactivity at the temperatures under which the asphalt compositions are stored, transferred and transported. The use of a hydrogen sulfide scavenger makes it possible to significantly reduce, or advantageously to eliminate, the release of $H_2S$ during the preparation, loading or unloading of a bitumen/polymer composition. Examples of suitable hydrogen sulfide scavengers, suitable amounts, and suitable methods of adding them to compositions include those described in PCT patent application publication WO2005065177, U.S. Patent Application Publication 2014/0357774, and U.S. Provisional Patent Application No. 62/166,733.

The asphalt composition may also include a sulfur source such as elemental sulfur, a sulfur donor, a sulfur byproduct, or combinations of two or more thereof, useful as crosslinking agents, as described in U.S. Provisional Patent Application No. 62/166,733.

Methods

A method for preparing a polymer modified asphalt comprises:

(1) providing one or both of an epoxy-functionalized ethylene copolymer (dipolymer or terpolymer) comprising copolymerized units of ethylene and copolymerized units of an epoxy-containing comonomer as described above and a nonreactive polymer as described above;

(2) heating and mixing the epoxy-functionalized ethylene copolymer, the nonreactive polymer, or the combination of polymers with asphalt to provide a polymer asphalt blend; and (3) adding phosphorous acid and mixing it with the polymer asphalt blend.

Examples of suitable processes for blending epoxy-functionalized polymers with asphalt include those in which the epoxy-functionalized ethylene copolymer comprises an ethylene vinyl acetate glycidyl methacrylate terpolymer, an ethylene n-butyl acrylate glycidyl methacrylate terpolymer or an ethylene methyl acrylate glycidyl methacrylate terpolymer.

Examples of suitable processes also include those in which step (2) comprises a) heating the base bitumen or asphalt to 150 to 195° C. either prior to or after addition to a reactor for modifying with the copolymer;

b) adding epoxy-functionalized ethylene copolymer, the nonreactive polymer, or combination of polymers to the heated asphalt in the reactor with stirring for about 10 or 15 minutes to about 1 to 4 hours while maintaining the temperature at 150 to 250° C.

Examples of suitable processes also include those in which step (3) comprises adding the phosphorous acid to the heated asphalt in the reactor with stirring for about 10 or 15 minutes to about 1 to 4 hours while maintaining the temperature at 150 to 250° C.

PMAs have been typically produced in a high sheer mill process, or a low sheer mixing process, as is well known to one skilled in the art. For example, the process is dependent on the equipment available, and on the polymers used. In general, polymers that can be used in low sheer mixing equipment can also be used in high sheer equipment. A molten mixture of asphalt and polymer modifiers can be heated at about 160 to about 250° C., or about 170 to 200° C. The molten mixture can be mixed by, for example, a mechanical agitator or any other mixing means.

Publications IS-200, from the Asphalt Institute of Lexington, Ky., are among the references that describe suitable methods for the commercial production of PMAs.

The base asphalt can be preheated to 150 to 180° C. or higher in a blending vessel to make it flowable. The ethylene copolymer and phosphorous acid can be added to asphalt with stirring at temperatures from 150 to 190° C., such as about 185 to 190° C. It is desirable to heat the materials to as low a temperature as necessary while still obtaining good processing rates.

The use of phosphorous acid allows for much greater flexibility of preparation of the polymer modified asphalt, compared to PMAs prepared with polyphosphoric acid. In some embodiments, the ethylene copolymer and the phosphorous acid are added to the heated asphalt in separate sequential steps, allowing for mixing the ethylene copolymer with the asphalt prior to adding the phosphorous acid. For example, the copolymer can be mixed with heated asphalt for a period of time such as 10 minutes to one hour, or more, followed by the addition of the phosphorous acid with further mixing for a period of time such as 10 minutes to one hour, or more. The ethylene copolymer can be added to the asphalt in an amount of about 1 to 10 weight %, based on the total weight of the PMA composition.

Alternatively, at least some of the ethylene copolymer can be added to the asphalt after addition of the phosphoric acid, if necessary to adjust the properties of the PMA. It also may be possible to add the ethylene copolymer and the phosphorous acid at nearly the same time, with a very short mixing period to melt the ethylene copolymer pellets. These options are not possible using polyphosphoric acid.

The phosphorous acid facilitates blending the polymer modifier with the asphalt, providing faster mixing times compared to addition of the polymer to the asphalt without the phosphorous acid. For example, improvements in properties such as pass/fail temperature, phase angle and elastic recovery of the polymer modified asphalt may be obtained in an hour or less (such as 10 or 15 minutes) after addition of the phosphorous acid. This may be significantly faster than PMAs containing the polymer alone and may even be faster than PMAs with polymer and polyphosphoric acid.

In other embodiments, an epoxy-containing ethylene copolymer (ECP) or a nonreactive polymer such as a SBS polymer can be combined with, or added to, flux oil or a plasticizer as described above by any means known to one skilled in the art to produce a solution or substantially a solution. The polymer modifier(s) and other optional components can be dissolved in the flux oil or liquid plasticizer by mixing with the oil or plasticizer prior to mixing with the asphalt. To facilitate the formation of a solution, the combination or addition can be mixed by, for example, mechanical means such as stirring. For example, the formation of an ECP solution in oil or plasticizer can be carried out under atmospheric condition, stirring for 10 to 30 minutes at 120 to 150° C. and 700 to 800 RPM. The resulting blend, a solution of polymer modifier in oil or plasticizer, has the consistency of free-flowing oil at elevated temperatures. Additional description of such processes may be found in U.S. Provisional Patent Application No. 62/121,078 (Intl. Patent Appln. No. PCT/US2016/019764.

The epoxy-containing ethylene copolymer solution can comprise about 1 to about 99, or about 10 to about 80, or about 20 to about 70, or about 25 to about 60% of an epoxy-containing ethylene copolymer and about 99 to about 1, or about 90 to about 20, or about 80 to about 30, or about 75 to about 40% of a flux oil, a liquid plasticizer or a blend of flux oil(s) or liquid plasticizer(s).

After its preparation, the epoxy-functionalized ethylene copolymer solution can be mixed with asphalt. Dispersion of the ethylene copolymer solution into the asphalt may take 10 to 60 minutes, followed by addition of the phosphorous acid with stirring for an additional period of time such as 10 to 60 minutes. As discussed above, use of phosphorous acid may provide alternative embodiments in which the epoxy-functionalized ethylene copolymer solution can be added to the heated asphalt portionwise before and after addition of the phosphorous acid, or the epoxy-functionalized ethylene copolymer solution can be added at the same time as the phosphorous acid.

Suitable uses of the polyepoxy-polymer-linked-asphalt composition described herein include the elastomeric modification of asphalt. The modified asphalt can be used in road pavement compositions, or in roofing materials such as shingles, sheets, or roll products, or in any other application typically using an elastomeric modified asphalt.

Accordingly, the polyepoxy-polymer-linked-asphalt composition described herein can be mixed with aggregates and used for paving. The paving composition has a ratio of about 1 to about 10 or about 5% asphalt and about 90 to about 99 or about 95% aggregates, by weight or by volume. One of ordinary skill is capable of selecting an appropriate parameter and value of the ratio. Mixtures of polymer-modified asphalts with aggregrates can be used for paving of highways, city streets, parking lots, ports, airfields, sidewalks, and many more. These mixtures can also be used as a chip seal, emulsions, or other repair product for paved surfaces.

The polyepoxy-polymer-linked-asphalt composition described herein can also be used as a roofing or waterproofing product.

The following examples are provided to describe the invention in further detail. These examples, which set forth specific embodiments and a preferred mode presently contemplated for carrying out the invention, are intended to illustrate and not to limit the invention.

EXAMPLES

Materials

Summarized in Table 1 are several ethylene copolymers containing glycidyl methacrylate (GMA) with n-butyl acrylate (nBA) or vinyl acetate (VA) comonomers that are useful for blending with bitumens to provide polymer-modified asphalts.

TABLE 1

| | Weight % in copolymer | | | |
|---|---|---|---|---|
| | GMA | nBA | VA | MI |
| EGMA-1 | 7.5 | 0 | 0 | 4 |
| EnBAGMA-1 | 2.5 | 28 | 0 | 2 |
| EnBAGMA-2 | 5.25 | 28 | 0 | 12 |
| EnBAGMA-3 | 9.0 | 21 | 0 | 8 |
| EnBAGMA-4 | 12.6 | 21.2 | 0 | 7.4 |
| EnBAGMA-5 | 13.9 | 20.7 | 0 | 7.4 |
| EnBAGMA-6 | 15.2 | 21.3 | 0 | 9 |
| EVAGMA-1 | 5.25 | 0 | 20 | 12 |
| EVAGMA-2 | 9-10 | 0 | 15 | 8 |
| EVAGMA-3 | 9 | 0 | 28 | 11.4 |
| EVAGMA-4 | 15.3 | 0 | 14.8 | 7.8 |
| EVAGMA-5 | 16.5 | 0 | 15 | 40 |
| EVAGMA-6 | 16.6 | 0 | 14.7 | 7.6 |
| EVAGMA-7 | 19.2 | 0 | 14.5 | 7.8 |

Table 2 lists several styrene copolymers available from Kraton Polymers, Inc. (Houston, Tex.) useful for blending with bitumens to provide polymer-modified asphalts.

TABLE 2

| | Grade | Styrene content (weight %) | Comonomer | Description |
|---|---|---|---|---|
| SBS-1 | D1101 | 31 | butadiene | Linear triblock |
| SBS-2 | D1102 | 28 | butadiene | Linear triblock |
| SIS-1 | D1107 | 15 | isoprene | Linear triblock |

The following acid promoters were purchased from Sigma-Aldrich (St. Louis, Mo.):
PPA: polyphosphoric acid, commercial grade.
PSA: phosphorous acid, commercial grade.

Asphalt samples were obtained from Valero (San Antonio Tex.) and Marathon Asphalt (Findlay, Ohio). They are designated with their PG values, as described above. The asphalt samples from Marathon have the same PG values, but come from different crude oil sources and exhibit different reactivity. A lot with qualitatively higher reactivity is designated "HR" and a lot with qualitatively lower reactivity is designated "LR". Additional samples were obtained from Total Azalt (Germany) and Shell (Germany) and are classified as "70/100" based on their penetration grade. Penetration Grade bitumen is commonly used in road surfacing and some industrial applications. A Penetration Test (ASTM D946-09 and EN12591-2009) determines the hardness of bitumen by measuring the depth (in tenths of a mm) to which a standard and a loaded needle will vertically penetrate in 5 seconds a sample of Bitumen maintained at a temperature of 25° C. (77° F.). Hence, the softer the bitumen, the greater will be its number of penetration units (e.g. 80/100 asphalt is softer than 40/50 asphalt in this classification system).

General Procedure for Blending Asphalt and Modifiers

A standard quart can in a heating mantle is used to for mixing asphalt and modifiers. The can lid is modified to include a center hole sufficient in diameter to accommodate the stirring shaft such that the shaft does not rub on the lid, with minimum open space between the shaft and the lid (approximately 1 cm in diameter), and a hole approximately 30 mm in diameter to allow introduction of a thermocouple probe to monitor the asphalt blend temperature. The stirring shaft is threaded through the lid so that the lid may be sealed on the sample can when the stirring shaft and motor are positioned to mix the sample.

Asphalt samples in 1-gallon cans were heated in a ventilated oven set at 165° C. until they were warm enough to be poured into the blending can. The asphalt sample (300 g) was poured into the blending can and the lid and stirrer assembly were attached. The polymer sample was added and the lid sealed tightly to the can. The asphalt and polymer were mixed for sixty minutes at 185° C. to blend them, then the acid was added and the mixture stirred for one additional hour to further blend all ingredients. Samples were removed and tested as described below.

The samples summarized in Table 3 were prepared according to the General Procedure above, except where noted. The Comparative Examples C1 to C6, C13 and C14 contained polyphosphoric acid (PPA) as the acid source and Examples 1 to 7, 13 and 14 contained phosphorous acid (PSA) as the acid source. Samples B1, B3, B4, B5, B6, B7, B8 and B9 were the base bitumens without additives. Sample B2 was the blend of the bitumen with 1.5 weight % of the ethylene copolymer modifier with no acid promoter added, with stirring for 6 hours to obtain complete blending. Comparative Examples C13-C14 and Examples 13-14 were prepared by mixing the base bitumen with the modifier for 3 hours, then mixing with the acid for an additional 1 hour. Samples C3, 3, C4 and 4 were also held at 165° C. for up to 7 days after blending was complete, to investigate whether the properties drifted down during extended periods of heating.

Comparative Example C6 and Example 6 were prepared by blending 1 weight % of the ethylene copolymer with the asphalt for sixty minutes at 185° C., adding the acid and stirring the mixture for one hour, and then blending in an additional 0.5 weight % of the ethylene copolymer for one additional hour. These runs were designed to demonstrate the behavior of the system when additional ethylene copolymer is added after acid was added to the mixture. In general, PPA can only be added after the asphalt and ethylene copolymer are well blended, or gelling will result. It is desirable, however, to be able to add additional ethylene copolymer after addition of acid to the mixture to further improve the properties of the PMA if the original amount of ethylene copolymer did not modify the asphalt sufficiently.

Comparative Examples B6 and B7, C8 and Examples 8 and 9 were prepared by blending the base asphalts for six hours at 185° C. using a paddle mixer, with or without polyphosphoric acid (1.5 weight %) or phosphorous acid (1.5 weight %). Samples C8 and 8 were also heat aged for 40 hours in an oven set at 165° C. These runs were designed to demonstrate the behavior of the system when phosphorous acid was added to the bitumen without a polymeric modifier.

Comparative Examples B8, C9 to C12 and Examples 10, 11 and 12 were prepared by blending the asphalt with SBS-1 modifier for forty minutes at 185° C. in a Silverson High Shear mixer and then an additional 1.5 hours with a paddle mixer at 185° C. For Comparative Examples C10, C11 and C12 and Examples 10, 11 and 12, either polyphosphoric acid or phosphorous acid (0.5, 1.0 or 1.5 weight % of acid) was added and the mixture blended for an additional hour. These runs were designed to demonstrate the behavior of the system when phosphorous acid was added to the mixture of bitumen with a nonreactive SBS polymeric modifier.

Comparative Examples C15, C16 and C17 and Examples 16 and 17 were prepared by blending the asphalt with SBS-1 modifier for forty minutes at 185° C. in a Silverson High Shear mixer and then EVAGMA-2 modifier was added, with mixing an additional 3 hours with a paddle mixer at 185° C. Comparative Example C15 had no acid but was cured for 8 hours at 185° C. For Comparative Examples C16 and C17 and Examples 16 and 17, polyphosphoric acid or phosphorous acid was added and the mixture blended for an additional hour. These runs were designed to demonstrate the behavior of the system when phosphorous acid was added to the mixture of bitumen with a nonreactive SBS polymeric modifier and a reactive polymeric modifier.

The properties of the blends were characterized as described below and summarized in Tables 4 and 5.

Dynamic Shear Rheometer failure temperature and phase angle were measured and reported below in Table 1. Average values were reported if multiple trials were run on the same material. Tests were performed on the PMA's according to ASSHTO T 315 or ASTM D7175-08 method to determine the Rheological Properties of Asphalt Binder Using a Dynamic Shear Rheometer (DSR). The Dynamic Shear Rheometer (DSR) is used to characterize the viscous and elastic behavior of asphalt binders at medium to high temperatures. This characterization is used in the Superpave PG asphalt binder specification. The DSR test method is used to determine the dynamic shear modulus and phase angle of asphalt binders when tested in dynamic (oscillatory) shear using parallel plate geometry and is intended for determining the linear viscoelastic properties of asphalt binders as required for specification testing.

The Pass/Fail temperatures are related to the temperature experienced by the pavement in the geographical area for which the asphalt binder is intended to be used. The Pass temperature is the value according to a Superpave classification scale to determine the asphalt performance grade (PG) where each value has a difference of 6° C., for example, 52, 58, 64, 70, 76, 82 or 88° C. and the Fail temperature is the actual value at which the modified asphalt fails.

TABLE 3

| Example | Asphalt | Modifier | | Acid | |
| --- | --- | --- | --- | --- | --- |
| | | Name | Weight % | Name | Weight % |
| B1 | Marathon PG64-22 | — | — | — | — |
| B2 | Marathon PG64-22 | EVAGMA-2 | 1.5 | — | — |
| C1 | Marathon PG64-22 | EVAGMA-2 | 1.5 | PPA | 0.2 |
| 1 | Marathon PG64-22 | EVAGMA-2 | 1.5 | PSA | 0.2 |
| B3 | Valero PG58-28 | — | — | — | — |
| C2 | Valero PG58-28 | EVAGMA-2 | 1.5 | PPA | 0.2 |
| 2 | Valero PG58-28 | EVAGMA-2 | 1.5 | PSA | 0.2 |
| B4 | Marathon PG64-22 HR | — | — | — | — |
| C3 | Marathon PG64-22 HR | EVAGMA-2 | 1.2 | PPA | 0.2 |
| 3 | Marathon PG64-22 HR | EVAGMA-2 | 1.2 | PSA | 0.2 |
| C4 | Marathon PG64-22 HR | EVAGMA-2 | 1.75 | PPA | 0.2 |
| 4 | Marathon PG64-22 HR | EVAGMA-2 | 1.75 | PSA | 0.2 |

TABLE 3-continued

| Example | Asphalt | Modifier Name | Modifier Weight % | Acid Name | Acid Weight % |
|---|---|---|---|---|---|
| B5 | Marathon PG64-22 LR | — | — | — | — |
| C5 | Marathon PG64-22 LR | EVAGMA-2 | 1.5 | PPA | 0.2 |
| 5 | Marathon PG64-22 LR | EVAGMA-2 | 1.5 | PSA | 0.2 |
| C6 | Marathon PG64-22 LR | EVAGMA-2 | 1.0 + 0.5 | PPA | 0.2 |
| 6 | Marathon PG64-22 LR | EVAGMA-2 | 1.0 + 0.5 | PSA | 0.2 |
| 7 | Marathon PG64-22 LR | EVAGMA-2 | 1.5 | PSA | 0.4 |
| B6 | Marathon PG64-22 D | — | — | — | — |
| C8 | Marathon PG64-22 D | — | — | PPA | 1.5 |
| 8 | Marathon PG64-22 D | — | — | PSA | 1.5 |
| B7 | Marathon PG64-22 S | — | — | — | — |
| 9 | Marathon PG64-22 S | — | — | PSA | 1.5 |
| B8 | Total Azalt 70/100 | — | — | — | — |
| C9 | Total Azalt 70/100 | SBS-1 | 4 | — | — |
| 10 | Total Azalt 70/100 | SBS-1 | 2.5 | PSA | 0.5 |
| C10 | Total Azalt 70/100 | SBS-1 | 2.5 | PPA | 0.5 |
| 11 | Total Azalt 70/100 | SBS-1 | 2.5 | PSA | 1.0 |
| C11 | Total Azalt 70/100 | SBS-1 | 2.5 | PPA | 1.0 |
| 12 | Total Azalt 70/100 | SBS-1 | 2.5 | PSA | 1.5 |
| C12 | Total Azalt 70/100 | SBS-1 | 2.5 | PPA | 1.5 |
| 13 | Total Azalt 70/100 | EVAGMA-2 | 2 | PSA | 0.3 |
| C13 | Total Azalt 70/100 | EVAGMA-2 | 2 | PPA | 0.3 |
| B9 | Shell 70/100 | — | — | — | — |
| 14 | Shell 70/100 | EVAGMA-2 | 2 | PSA | 0.3 |
| C14 | Shell 70/100 | EVAGMA-2 | 2 | PPA | 0.3 |
| C15 | Shell 70/100 | SBS-1<br>EVAGMA-2 | 1.5<br>1.5 | — | — |
| 16 | Shell 70/100 | SBS-1<br>EVAGMA-2 | 1.5<br>1.5 | PSA | 0.5 |
| C16 | Shell 70/100 | SBS-1<br>EVAGMA-2 | 1.5<br>1.5 | PPA | 0.5 |
| 17 | Shell 70/100 | SBS-1<br>EVAGMA-2 | 1.5<br>1.5 | PSA | 0.7 |
| C17 | Shell 70/100 | SBS-1<br>EVAGMA-2 | 1.5<br>1.5 | PPA | 0.7 |

TABLE 4

| Example | DSR ASTM D7175 Pass Temperature (° C.) | DSR ASTM D7175 Fail Temperature (° C.) | DSR ASTM D7175 Phase Angle (°) | Elastic Recovery ASTM D6084 at 25° C. (%) | MSCR ASTM D7504-10a Jnr (3.2) | MSCR ASTM D7504-10a % R (3.2) |
|---|---|---|---|---|---|---|
| B1 | 64 | 67.5 | 85.22 | | | |
| B2 | 82 | 82.5 | 74.26 | | | |
| C1 | 76 | 78.7 | 62.48 | 70 | 0.2513 | 74.91 |
| 1 | 82 | 84.6 | 60.43 | 81.25 | 0.1538 | 79.38 |
| B3 | 58 | 59.3 | 85.35 | | | |
| C2 | Gelled immediately after adding PPA | | | | | |
| 2 | 70 | 74 | 63.25 | 81.25 | | |
| B4 | 64 | 65.7 | 86.5 | | | |
| C3 | 70 | 76 | 65.7 | 80 | | |
| 3 | 70 | 74 | 66.2 | 83 | | |
| C3 aged | 70 | 71.4 | 72.7 | | | |
| 3 aged | 70 | 74.6 | 67 | | | |
| C4 | 88 | 88.8 | 57 | | | |
| 4 | 76 | 81.2 | 59.39 | | | |
| C4 aged | Gelled after aging one day at 165° C. | | | | | |
| 4 aged | No change in properties after aging 7 days at 165° C. | | | | | |
| B5 | 64 | 67 | 87.1 | | | |
| C5 | 70 | 72.1 | 64.93 | 70 | | |
| 5 | 76 | 77.3 | 63.63 | 81.25 | | |
| C6 | Gelled 15 minutes after the second addition of EVAGMA-2 | | | | | |
| 6 | 76 | 78 | 63.72 | | | |
| 7 | 76 | 79.6 | 63.74 | 80 | | |
| B6 | 64 | 67.4 | 87.1 | | | |

TABLE 4-continued

| | | | | Viscosity (mPa-second) | |
|---|---|---|---|---|---|
| | | | | 135° C. | 165° C. |
| C8 | 76 | 81.5 | 76.6 | 1680 | 357 |
| 8 | 76 | 79.8 | 79.8 | 1363 | 310 |
| C8 aged | 76 | 83.2 | 77.84 | 1810 | 370 |
| 8 aged | 76 | 81 | 78.74 | 1335 | 290 |
| B7 | 64 | 67.5 | 85.22 | | |
| 9 | 76 | 78 | 77.4 | | |

The phase angle defines the resistance to shear deformation of the asphalt binder in the linear viscoelastic region. The phase angle may depend upon the magnitude of the shear strain. Phase angle for both unmodified and modified asphalt decreases with increasing shear strain. Desirably, phase angles are below 70 for most asphalt applications.

Elastic recovery was measured in accordance with ASTM D6084. Multiple Stress Creep and Recovery (MSCR) data were measured in accordance with ASTM D7405-10a. Ring and Ball tests were conducted according to ASTM D36/36M-14, on green material and after a Rolling Thin Film Oven Test. In the Ring and Ball test, two horizontal disks of bitumen, cast in shouldered brass rings, are heated at a controlled rate in a liquid bath while each supports a steel ball. The softening point is reported as the mean of the temperatures at which the two disks soften enough to allow each ball, enveloped in bitumen, to fall a distance of 25 mm (1.0 inch). Viscosity was measured using a Brookfield Rotational Viscometer according to ASTM D7741.

The data in Table 4 show that addition of an ethylene copolymer modifier without acid provided improved performance over the base bitumen (B2 compared to B1) as evidenced by higher PG fail temperature and lower phase angle. However, the phase angle was still too high to be useful in most applications. Using phosphorous acid instead of polyphosphoric acid provided even better performance (Example 1 compared to Comparative Example C1). Similar results were seen for Example 5 compared to Comparative Example C5.

Example 2 shows that phosphorous acid can successfully modify low asphaltene bitumen, whereas polyphosphoric acid resulted in gelling (Comparative Example C2).

Examples 3 and 4 showed that the properties of modified asphalt prepared using phosphorous acid were retained on extended heat aging, while Comparative Examples C3 and C4 resulted in drift down of properties or gelling. Comparative Example C4 was close to gelling during the mixing phase, resulting in higher than expected PG fail temperature and good phase angle, which could not be maintained during extended heat aging. Example 4 also showed that higher levels of modifier could be added using phosphorous acid.

Example 6 showed that using phosphorous acid allowed for additional modifier to be added after the acid was added to allow for further adjusting the properties. Polyphosphoric acid caused gelling when additional modifier was added (Comparative Example C6). The properties resulting from the two-part addition of ethylene copolymer (Example 6) were very similar to those resulting from the standard one-part addition (Example 5).

Example 7 showed that higher levels of phosphorous acid could be used without detrimental gelling, providing somewhat higher PG failure temperature.

Examples 8 and 9 showed that phosphorous acid alone provided improved properties over their respective base asphalts, with their PG ratings raised by two grades and phase angle significantly improved over their respective base asphalt. The results for asphalt modified with phosphorous acid were similar to those for asphalt modified with polyphosphoric acid (Comparative Examples C8 and C9). The phosphorous acid modified sample had significantly lower (better) viscosity than the polyphosphoric acid modified sample. After heat aging, asphalt modified with either polyphosphoric acid or phosphorous acid showed little change in PG fail temperature or phase angle, but the asphalt with polyphosphoric acid showed a greater increase in viscosity, suggesting that it may degrade more rapidly on aging.

TABLE 5

| | DSR ASTM D7175 | | | Elastic Recovery | Viscosity (mPa-second) | | Ring and ball, ° C. | |
|---|---|---|---|---|---|---|---|---|
| Example | Pass Temperature (° C.) | Fail Temperature (° C.) | Phase Angle (°) | ASTM D6084 at 25° C. (%) | at 135° C. | at 160° C. | green | RTFOT |
| B8 | 64 | 64.87 | 87.13 | | | | 46.7 | |
| C9 | 76 | 77.07 | 82.01 | 85.5 | 1153 | 444 | 66.5 | 63.6 |
| 10 | 76 | 79.92 | 81.08 | 66 | 1327 | 411 | 61.1 | 67.5 |
| C10 | 82 | 83.74 | 80.35 | 71 | 1747 | 511 | 62.8 | 70 |
| 11 | 88 | 88.68 | 81.49 | 53.1 | 2367 | 641 | 67.3 | 75.7 |
| C11 | 92 | 92.4 | 75.68 | 66.2 | 3260 | 808 | 72 | 80.2 |
| 12 | 92 | 92.18 | 79.54 | 55.6 | 2973 | 742 | 71.3 | 78.4 |
| C12 | 104 | 105.05 | 70.69 | 65.8 | 7540 | 1520 | 87.2 | 96.1 |
| 13 | 82 | 85.42 | 65.12 | 85 | 2633 | 646 | 67.2 | 76.6 |
| C13 | 88 | 88.99 | 62.51 | 85.5 | 3227 | 720 | 70.4 | 74.7 |
| B9 | 64 | 64.7 | 80.47 | | | | 47.6 | |
| 14 | 76 | 80.71 | 66.26 | 86 | 1832 | 485 | 63.5 | 73.4 |
| C14 | 82 | 83.16 | 63.03 | 87 | 2347 | 567 | 66.9 | 71.9 |

TABLE 5-continued

| | DSR ASTM D7175 | | | Elastic Recovery | | | | |
| | Pass Temperature | Fail Temperature | Phase Angle | ASTM D6084 | Viscosity (mPa-second) | | Ring and ball, ° C. | |
| Example | (° C.) | (° C.) | (°) | (%) | at 135° C. | at 160° C. | green | RTFOT |
|---|---|---|---|---|---|---|---|---|
| C15 | 76 | 75.99 | 64.42 | 73.8 | 1188 | 393 | 58.2 | 64.2 |
| 16 | 88 | 92.09 | 66.55 | 83.5 | 4270 | 1020 | 73.5 | 76.5 |
| C16 | 88 | 91.25 | 64.4 | 85 | 3580 | 828 | 71.8 | 78.2 |
| 17 | 88 | 91.72 | 67.84 | 81.5 | 5333 | 855 | 71.3 | 76.2 |
| C17 | 94 | 96.93 | 63.58 | 82.3 | 5350 | 1150 | 76.7 | 82.3 |

As shown in Table 5, the results for Examples 13 and 14 were similar, with the samples modified with phosphorous acid having similar PG failure temperatures and phase angles, with lower viscosity and higher Ring and Ball softening temperatures, compared to their respective Comparative Examples. Interestingly, the green Ring and Ball tests for the phosphorous acid modified examples were lower than their comparatives, but were higher after the RTFOT.

Comparative Example C9 showed that the addition of a nonreactive polymer to base bitumen B8 provided improved properties, with the PG rating raised by two grades, phase angle somewhat improved, and its ring and ball rating softening point significantly higher. Examples 10-12 showed that addition of phosphorous acid to asphalt modified by the nonreactive polymer additive provided additional improvement in PG failure temperature, but little further improvement in phase angle. Ring and Ball softening point was raised with phosphorous acid. Comparative Examples C10-C12 used polyphosphoric acid. They provided better PG ratings and phase angles and Ring and Ball results, but also had significantly higher viscosities than Examples modified with phosphorous acid.

Examples 16 and 17 showed that a combination of reactive modifier EVAGMA-2 and nonreactive modifier SBS-1 and phosphorous acid provided significantly superior properties over the asphalt modified with EVAGMA-2 and SBS-1 without acid (Comparative Example C15), and also over asphalt modified with EVAGMA-2 and phosphorous acid (Example 14). PG fail temperature, phase angle and ring and ball results were significantly improved using the combination of modifiers in the presence of phosphorous acid. The PG fail temperature and phase angle were similar to those of asphalt modified using polyphosphoric acid.

In summary, asphalt modified with phosphorous acid alone had equal or better performance compared to asphalt modified with polyphosphoric acid. The improved properties of asphalt modified with phosphorous acid compared to polyphosphoric acid were especially apparent when polymer modifiers such as epoxy-containing ethylene copolymers or SBS polymers were used.

Embodiments of the invention include:
1. An asphalt composition comprising asphalt and about 0.1 to about 2 weight % of phosphorous acid, based on the total asphalt composition.
2. A polyepoxy-polymer-linked-asphalt composition of embodiment 1 comprising
   (a) asphalt in about 89 to about 99.4 weight %, based on the total of component (a), component (b) and component (c);
   (b) about 0.5 to about 10 weight %, based on the total of component (a), component (b) and component (c), of an E/X/Y/Z epoxy-functionalized ethylene copolymer, wherein E is the copolymer unit —(CH$_2$CH$_2$)— derived from ethylene; X is the copolymer unit —(CH$_2$CR$^1$R$^2$)—, where R$^1$ is hydrogen, methyl, or ethyl, and R$^2$ is carboalkoxy, acyloxy, or alkoxy of 1 to 10 carbon atoms, present in from 0 to about 40 weight % of the copolymer; Y is the copolymer unit —(CH$_2$CR$^3$R$^4$)—, where R$^3$ is hydrogen or methyl and R$^4$ is carboglycidoxy or glycidoxy present in from 0.3 to 25 weight % of the copolymer, Z is the copolymer unit derived from comonomers including carbon monoxide, sulfur dioxide, acrylonitrile, or other monomers, present in from 0 to about 10 weight % of the copolymer; and
   (c) about 0.1 to about 1 weight % of phosphorous acid, based on the total of component (a), component (b) and component (c).
3. The composition of embodiment 2 wherein the epoxy-containing comonomer Y comprises glycidyl acrylate, glycidyl methacrylate, glycidyl butyl acrylate, glycidyl vinyl ether, or combinations of two or more thereof.
4. The composition of embodiment 3 wherein the comonomer Y is glycidyl acrylate or glycidyl methacrylate.
5. The composition of embodiment 2 wherein the ethylene copolymer is an ethylene vinyl acetate glycidyl methacrylate terpolymer.
6. The composition of embodiment 2 wherein the ethylene copolymer is an ethylene n-butyl acrylate glycidyl methacrylate or ethylene methyl acrylate glycidyl methacrylate terpolymer.
7. The composition of embodiment 2 wherein the ethylene copolymer is an ethylene glycidyl methacrylate dipolymer.
8. The composition of embodiment 2 wherein Y comprises a glycidyl moiety and is present in the copolymer from a lower limit of about 0.3 to an upper limit of 15 weight %.
9. The composition of embodiment 2 wherein Y comprises a glycidyl moiety and is present in the copolymer from a lower limit of 15.1 to an upper limit of 25 weight %.
10. The composition of embodiment 2 wherein Y comprises a glycidyl moiety and is present in the copolymer from a lower limit of 16 to an upper limit of 25 weight %.
11. The composition of embodiment 2 further comprising an ethylene acrylate, ethylene methacrylate or ethylene vinyl acetate copolymer, styrene/conjugated-diene block copolymer, polyolefin, or combinations thereof.
12. The composition of embodiment 11 comprising ethylene acrylate, ethylene methacrylate or ethylene vinyl acetate copolymer.
13. The composition of embodiment 11 comprising a polyolefin, wherein the polyolefin comprises polyethylene, polypropylene, polybutene, polyisobutene, ethylene/propylene copolymers, ethylene/propylene/diene terpolymers, polybutadiene, polyisoprene or polynorbornene.

14. The composition of embodiment 11 comprising a styrene/conjugated-diene block copolymer.
15. The composition of embodiment 14 wherein the styrene/conjugated-diene block copolymer comprises butadiene, isoprene, ethylene butene, or 1,3-pentadiene.
16. The composition of embodiment 14 wherein the styrene/conjugated-diene block copolymer comprises a di-, tri- or poly-block copolymer having a linear or radial structure, with or without a random junction.
17. The composition of embodiment 14 wherein the styrene/conjugated-diene block copolymer comprises a diblock A-B type copolymer; linear (triblock) A-B-A type copolymer; or radial (A-B)$_n$ type copolymers; wherein A refers to a copolymer unit derived from styrene and B refers to a copolymer unit derived from a conjugated-diene.
18. The composition of embodiment 14 wherein the styrene/conjugated-diene block copolymer comprises about 10 to about 50 weight percent copolymer units derived from styrene and about 50 to about 90 weight percent copolymer units derived from a conjugated-diene.
19. The composition of embodiment 14 wherein the conjugated-diene comprises butadiene.
20. The composition of embodiment 1 further comprising an ethylene acrylate, ethylene methacrylate or ethylene vinyl acetate copolymer, styrene/conjugated-diene block copolymer, polyolefin, or combinations thereof.
21. The composition of embodiment 20 comprising ethylene acrylate, ethylene methacrylate or ethylene vinyl acetate copolymer.
22. The composition of embodiment 20 comprising a polyolefin, wherein the polyolefin comprises polyethylene, polypropylene, polybutene, polyisobutene, ethylene/propylene copolymers, ethylene/propylene/diene terpolymers, polybutadiene, polyisoprene or polynorbornene.
23. The composition of embodiment 20 comprising a styrene/conjugated-diene block copolymer.
24. The composition of embodiment 23 wherein the styrene/conjugated-diene block copolymer comprises butadiene, isoprene, ethylene butene, or 1,3-pentadiene.
25. The composition of embodiment 23 wherein the styrene/conjugated-diene block copolymer comprises a di-, tri- or poly-block copolymer having a linear or radial structure, with or without a random junction.
26. The composition of embodiment 23 wherein the styrene/conjugated-diene block copolymer comprises a diblock A-B type copolymer; linear (triblock) A-B-A type copolymer; or radial (A-B)$_n$ type copolymers; wherein A refers to a copolymer unit derived from styrene and B refers to a copolymer unit derived from a conjugated-diene.
27. The composition of embodiment 23 wherein the styrene/conjugated-diene block copolymer comprises about 10 to about 50 weight percent copolymer units derived from styrene and about 50 to about 90 weight percent copolymer units derived from a conjugated-diene.
28. The composition of embodiment 23 wherein the conjugated-diene comprises butadiene.
29. The composition of embodiment 1, or embodiment 2, or embodiment 11, or embodiment 20, wherein the modified asphalt further comprises flux oil, liquid plasticizer, amine scavenger, hydrogen sulfide scavenger, or combinations thereof.
30. The composition of embodiment 29 wherein the flux oil comprises an aromatic oil, paraffinic oil, mineral oil, vegetable oil or blends thereof; and the liquid plasticizer comprises a dicarboxylic or tricarboxylic ester-based plasticizer, acetic acid ester of a monoglyceride, trimellitate, adipate, benzoate, adipic acid polyester, polyether-ester, epoxy ester, maleate.
31. A method for preparing a polymer modified asphalt, the method comprising:
   (1) providing an epoxy-functionalized ethylene copolymer (dipolymer or terpolymer) comprising copolymerized units of ethylene and copolymerized units of an epoxy-containing comonomer as described above, a nonreactive polymer as described above, or a combination of the epoxy-functionalized ethylene copolymer and the nonreactive polymer;
   (2) heating and mixing the epoxy-functionalized ethylene copolymer, the nonreactive polymer, or combination of polymers with asphalt to provide a polymer asphalt blend; and
   (3) adding phosphorous acid and mixing it with the polymer asphalt blend.
32. A method for preparing a polymer modified asphalt, the method comprising:
   (1) providing an epoxy-functionalized ethylene copolymer according to embodiment 2;
   (2) heating and mixing the copolymer with asphalt to provide a polymer asphalt blend; and
   (3) adding phosphorous acid and mixing it with the polymer asphalt blend.
33. The method of embodiment 32 wherein the epoxy-functionalized ethylene copolymer comprises an ethylene glycidyl methacrylate dipolymer, an ethylene vinyl acetate glycidyl methacrylate terpolymer, an ethylene n-butyl acrylate glycidyl methacrylate terpolymer or ethylene methyl acrylate glycidyl methacrylate terpolymer; wherein
   step (2) comprises
   a) heating the asphalt to 150 to 195° C. either prior to or after addition to a reactor for modifying with the copolymer;
   b) adding the copolymer to the heated asphalt in the reactor with stirring for about 10 minutes to about 4 hours while maintaining the temperature at 150 to 250° C.; and
   step (3) comprises adding phosphorous acid to the heated polymer asphalt blend in the reactor with stirring for about 10 minutes to about 4 hours while maintaining the temperature at 150 to 250° C.
34. The method of embodiment 31 wherein an ethylene acrylate, ethylene methacrylate or ethylene vinyl acetate copolymer, styrene/conjugated-diene block copolymer, polyolefin, or combination thereof is added to the heated asphalt.
35. The method of embodiment 31 wherein the ethylene copolymer is dissolved in flux oil or liquid plasticizer prior to mixing with the asphalt.
36. A road pavement or roofing material comprising a composition according to embodiment 1, or embodiment 2, or embodiment 11, or embodiment 20, or embodiment 29.

While certain of the preferred embodiments of this invention have been described and specifically exemplified above, it is not intended that the invention be limited to such embodiments. Various modifications may be made without departing from the scope and spirit of the invention, as set forth in the following claims.

What is claimed is:
1. An asphalt composition comprising asphalt and about 0.1 to about 2 weight % of phosphorous acid, based on the total weight of the asphalt composition.

2. A polyepoxy-polymer-linked-asphalt composition comprising
  (a) about 89 to about 99.4 weight % of asphalt;
  (b) about 0.5 to about 10 weight % of an E/X/Y/Z epoxy-functionalized ethylene copolymer, wherein E represents the copolymerized repeat unit —(CH$_2$CH$_2$)— derived from ethylene; X represents the copolymerized repeat unit —(CH$_2$CR$^1$R$^2$)—, where R$^1$ is hydrogen, methyl, or ethyl, and R$^2$ is carboalkoxy, acyloxy, or alkoxy of 1 to 10 carbon atoms; Y represents the copolymerized repeat unit —(CH$_2$CR$^3$R$^4$)—, where R$^3$ is hydrogen or methyl and R$^4$ is carboglycidoxy or glycidoxy; and Z represents the copolymerized repeat unit derived from one or more additional comonomers; wherein the E/X/Y/Z epoxy-functionalized ethylene copolymer comprises 0 to 40 wt % of copolymerized repeat units of X, 0.3 to 25 wt % of copolymerized repeat units of Y, and 0 to 10 wt % of copolymerized repeat units of Z; wherein the weight percentages of the copolymerized repeat units of X, Y, and Z are based on the total weight of the E/X/Y/Z epoxy-functionalized ethylene copolymer; and wherein the sum of the weight percentages of E, X, Y, and Z in the E/X/Y/Z epoxy-functionalized ethylene copolymer is 100 wt %; and
  (c) about 0.1 to about 1 weight % of phosphorous acid, and
wherein the weight percentages of the asphalt, the E/X/Y/Z epoxy-functionalized ethylene copolymer, and the phosphorous acid are based on the total weight of the polyepoxy-polymer-linked-asphalt composition.

3. The polyepoxy-polymer-linked-asphalt composition of claim 2, wherein the E/X/Y/Z epoxy-functionalized ethylene copolymer comprises repeat units of one or more epoxy-containing comonomers Y selected from the group consisting of glycidyl acrylate, glycidyl methacrylate, glycidyl butyl acrylate, and glycidyl vinyl ether.

4. The polyepoxy-polymer-linked-asphalt composition of claim 2, wherein the E/X/Y/Z epoxy-functionalized ethylene copolymer is selected from the group consisting of an ethylene glycidyl methacrylate dipolymer, an ethylene vinyl acetate glycidyl methacrylate terpolymer, an ethylene n-butyl acrylate glycidyl methacrylate terpolymer, and an ethylene methyl acrylate glycidyl methacrylate terpolymer.

5. The polyepoxy-polymer-linked-asphalt composition of claim 2, wherein the comonomer Y comprises a glycidyl moiety and wherein the amount of copolymerized repeat units of Y in the E/X/Y/Z epoxy-functionalized ethylene copolymer is from about 0.3 to about 15 weight %.

6. The polyepoxy-polymer-linked-asphalt composition of claim 2, wherein the comonomer Y comprises a glycidyl moiety and wherein the amount of copolymerized repeat units of Y in the E/X/Y/Z epoxy-functionalized ethylene copolymer is from about 15.1 to about 25 weight %.

7. The polyepoxy-polymer-linked-asphalt composition of claim 2, further comprising at least one nonreactive polymer selected from the group consisting of an ethylene acrylate, an ethylene methacrylate or an ethylene vinyl acetate copolymer; a styrene/conjugated-diene block copolymer, wherein the styrene/conjugated-diene block copolymer comprises a di-, tri- or poly-block copolymer having a linear or radial structure, with or without a random junction; and a polyolefin.

8. The polyepoxy-polymer-linked-asphalt composition of claim 7, wherein the styrene/conjugated-diene block copolymer comprises about 10 to about 50 weight percent of copolymerized repeat units derived from styrene and about 50 to about 90 weight percent of copolymerized repeat units derived from a conjugated diene.

9. The polyepoxy-polymer-linked-asphalt composition of claim 2, further comprising one or more additives selected from the group consisting of flux oils, liquid plasticizers, amine scavengers, hydrogen sulfide scavengers, and sulfur sources.

10. A method for preparing the asphalt composition according to claim 1, said method comprising heating an asphalt, and mixing the heated asphalt with phosphorous acid.

11. A method for preparing the polyepoxy-polymer-linked-asphalt composition of claim 2, said method comprising:
  (1) providing one or more polymers selected from the group consisting of an epoxy-functionalized ethylene copolymer and a nonreactive polymer;
  (2) heating and mixing the polymer(s) with asphalt to provide a polymer-asphalt blend;
  (3) adding phosphorous acid to the polymer-asphalt blend; and
  (4) mixing the phosphorous acid with the polymer-asphalt blend.

12. The method of claim 11, wherein step (2) comprises:
  a) heating the asphalt to 150 to 195° C. either prior to or after addition to a reactor for modifying with the polymer(s); and
  b) adding the polymer(s) to the heated asphalt in the reactor with stirring for about 10 minutes to about 4 hours while maintaining the temperature at 150 to 250° C.; and
wherein step (3) comprises:
  adding phosphorous acid to the heated polymer asphalt blend in the reactor with stirring for about 10 minutes to about 4 hours while maintaining the temperature at 150 to 250° C.

13. The method of claim 11, wherein the polymer(s) are dissolved in flux oil or liquid plasticizer prior to mixing with the asphalt.

14. A road pavement or roofing material comprising the asphalt composition of claim 1.

15. A road pavement or roofing material comprising the asphalt composition of claim 2.

16. A method for preparing the polyepoxy-polymer-linked-asphalt composition of claim 2, said method comprising the steps of heating an asphalt and mixing the heated asphalt with phosphorous acid.

17. The polyepoxy-polymer-linked-asphalt composition of claim 7, wherein the conjugated-diene of the styrene/conjugated-diene block copolymer comprises butadiene, isoprene, ethylene butene, or 1,3-pentadiene; or wherein the polyolefin comprises polyethylene, polypropylene, polybutene, polyisobutene, ethylene/propylene copolymers, ethylene/propylene/diene terpolymers, polybutadiene, polyisoprene or polynorbornene.

18. The polyepoxy-polymer-linked-asphalt composition of claim 7, wherein the styrene/conjugated-diene block copolymer comprises a diblock A-B type copolymer; linear (triblock) A-B-A type copolymer; or radial (A-B)n type copolymers; wherein A refers to a copolymerized repeat unit derived from styrene and B refers to a copolymerized repeat unit derived from a conjugated diene.

19. The polyepoxy-polymer-linked-asphalt composition of claim 9, wherein the flux oil(s) comprise one or more of an aromatic oil, a paraffinic oil, a mineral oil, and a vegetable oil; or wherein the liquid plasticizer(s) comprise one or more of a dicarboxylic ester-based plasticizer, a tricarboxylic ester-based plasticizer, and an acetic acid ester of a monoglyceride, trimellitate, adipate, benzoate, adipic acid polyester, polyetherester, epoxy ester, or maleate.

* * * * *